(12) United States Patent
Watson

(10) Patent No.: US 6,416,189 B1
(45) Date of Patent: Jul. 9, 2002

(54) WATER-RESISTANT, SCOPE SHADE ATTACHMENT APPARATUS

(76) Inventor: Christopher Michael Watson, 1193 North Franklin St., Washington, PA (US) 15301

( * ) Notice: Subject to any disclaimer, the term of this patent is extended or adjusted under 35 U.S.C. 154(b) by 0 days.

(21) Appl. No.: 09/670,183

(22) Filed: Sep. 26, 2000

(51) Int. Cl.⁷ .......................... G02B 21/00; G03B 11/04
(52) U.S. Cl. ........................ 359/611; 359/511; 359/601
(58) Field of Search .................... 359/511, 600, 359/611–612, 808–821, 406; 33/244–245, 262–263; 396/448

(56) References Cited

U.S. PATENT DOCUMENTS

| | | | |
|---|---|---|---|
| 2,488,188 A | * 11/1949 | Halvorson | .................. 359/511 |
| 2,849,795 A | * 9/1958 | Vissing | ........................ 359/511 |
| 2,889,629 A | * 6/1959 | Darkenwald | ................. 359/511 |
| 3,831,285 A | * 8/1974 | Vissing | ........................ 359/511 |
| 5,495,676 A | * 3/1996 | Chesnut et al. | ................ 33/244 |
| 5,815,316 A | * 9/1998 | Friedman et al. | ............ 359/600 |

* cited by examiner

*Primary Examiner*—Thong Nguyen
(74) *Attorney, Agent, or Firm*—John D. Gugliotta; P. Jeff Martin; Richard K. Thomson

(57) ABSTRACT

A water-resistant scope shade is provided having a sun shielding barrel which includes a barrel grasping collar and a barrel body, and a pivotal hood affixed to the barrel. The sun shielding barrel is removably attached to a sighting end of a telescopic sight of a rifle.pivotal hood includes lens of a circular configuration to be fittingly received on a collar of the pivoting hood.

4 Claims, 4 Drawing Sheets

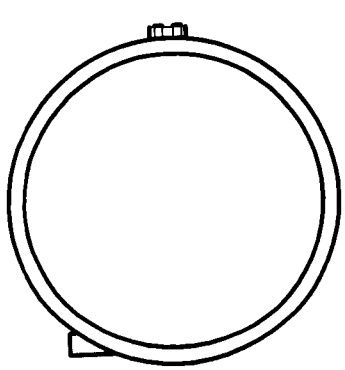 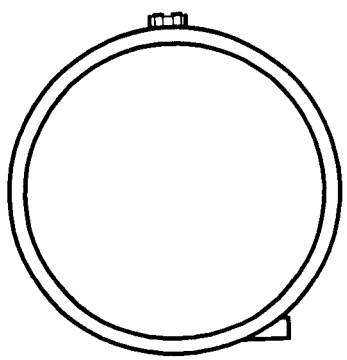
Figure 5        Figure 6
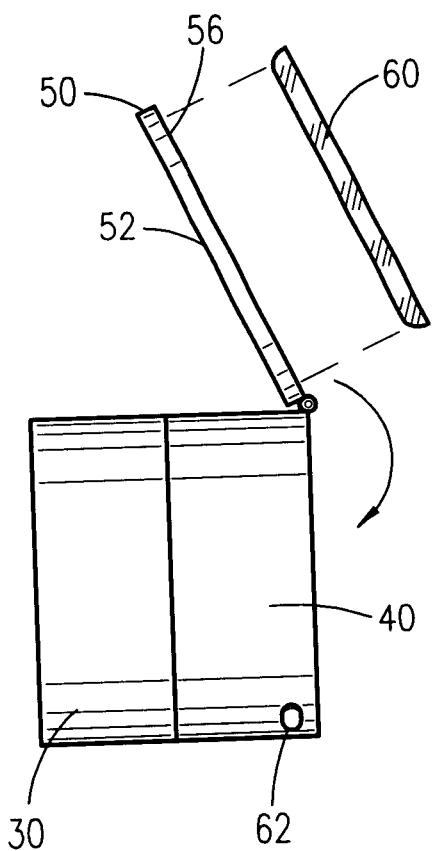
Figure 7

WATER-RESISTANT, SCOPE SHADE ATTACHMENT APPARATUS

BACKGROUND OF THE INVENTION

1. Field of the Invention

The present invention relates generally to sun shielding attachments for gun sights and, more particularly, to a water-resistant, scope shade attachment apparatus.

2. Description of the Related Art

Over the years, modern advances in hunting equipment have enhanced the sport, providing hunters with increased success. Among these products, scopes used on high-powered rifles as well as hunting handguns offer long-range targeting capabilities with exceptional accuracies. However, as with most precision equipment, they must be treated with care. The physical dangers can affect the aesthetics and accuracy of such scopes. Additionally, environmental dangers such as dirt, dust, rain and the like can have an impact on the usage and targeting capabilities of a scope as well. Accordingly, there is a need for a device that will allow for the protection of gun and rifle scopes by protecting them from environmental damage such as rain, dirt and dust.

A search of the prior art did not disclose any patents that read directly on the claims of the instant invention; however, the following references were considered related. The following patents disclose the design and function of a front rifle scope guard: U.S. Pat. No. 4,926,560 issued in the name of Kilgore et al.; U.S. Pat. No. 4,815,822 issued in the name of Bramhall; U.S. Pat. No. 4,089,117 issued in the name of Villareal; U.S. Pat. No. 3,983,634 issued in the name of Erickson; U.S. Pat. No. 2,855,680 issued in the name of Christensen; and U.S. Pat. No. D 279,194 issued in the name of Surber.

U.S. Pat. No. 4,610,517 issued in the name of Fukino et al. describes a clamp for a lens hood.

U.S. Pat. No. 4,050,791 issued in the name of Watanabe discloses a filter holder insertable into the lens barrel of a camera.

U.S. Pat. No. 3,977,113 issued in the name of Howell describes a guard for the telescopic sight of a rifle.

Consequently, a need has been felt for providing a device which allows for both shading of sunlight when using a rifle scope so as to improve the optics when used in bright light, as well as to alternately function as a mechanical and rain guard, protecting the scope from water or superficial mechanical damage.

SUMMARY OF THE INVENTION

Therefore, it is an object of the present invention to provide a user with a water-resistant, glare-free rifle telescopic sight attachment apparatus which eases eye strain when hunting game in bright sunlight.

Briefly described according to one embodiment of the present invention, an attachable, portable, water-resistant sun shielding barrel is disclosed which includes a barrel grasping collar, a barrel body, and a pivotal hood for being removably attached to a sighting end of a telescopic sight of a rifle.

The barrel grasping collar is of an elongated flexible, hollow configuration formed of rubber and extends a longitudinal length of approximately one inch to three inches in a direction from an anterior end to the posterior end of the sun shielding barrel. The barrel grasping collar mates with the sighting end of a telescopic sight. The barrel grasping collar is securely held in such position through frictional impingement.

The barrel body is of an elongated, hollow configuration and is formed of flexible plastic. The barrel body is located adjacent to the barrel grasping collar and extends longitudinally therefrom to the posterior end of the sun shielding barrel.

The pivoting hood is attached to the barrel body by a hinge which is mounted at a top of the barrel body at the posterior end of the barrel. The hood may be pivoted at its hinge point to lay flat against a collar of the barrel body. The pivoting hood includes a plurality of projections formed at various points along an inner periphery of the pivoting hood for removably securing a lens.

The projections are spaced at an equal distance from one another and are formed of plastic material having resilient properties so as to demountably secure a lens to the inner periphery.

The pivoting hood further includes a thin, soft rubber membrane circumferentially joined to a collar thereof so as to form a water-impermeable seal upon a user laying the hood flat against the collar of the barrel body.

The hood and the barrel body can be locked into their closed position via a hood locking assembly. The hood locking assembly includes a hood release button located adjacent to a hole of the barrel body. After being depressed by a user, the button is designed so as to allow the pivoting hood to be opened, thereby allowing the user to replace the present lens with an alternate lens.

Various degrees of shaded lens having an antifog feature are available to the user; alternatively, a photogray lens which automatically adjust to outside light may be utilized.

The shaded lens not only provide ultraviolet alpha and ultraviolet beta, but are also scratch and shatter proof as well.

The lens can be replaced while the present invention remains attached to the telescopic sight, thereby allowing the user to quickly change lens.

Once a chosen lens has been securely placed at the inner periphery of the hood, the user simply closes the hood thereby forming a water-impermeable seal which also keeps the sighting end of the telescopic sight dry, clean and protected.

The water-resistant scope shade attachment apparatus provides the user with a water-resistant, glare-free rifle telescopic sight attachment which eases eye strain when hunting game in bright sunlight.

An advantage of the present invention is that it protects the precision components of scope assembly.

Another advantage of the present invention is that it attaches to conventionally available scope types.

Further, the present invention protects scope from dirts, dust, rain and the like.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5 is rear view thereof shown with the pivoting hood in a closed position;

FIG. 6 is a front view thereof shown with the pivoting hood in an open position;

FIG. 7 is an exploded perspective view of the water-resistant scope shade attachment apparatus according to the preferred embodiment of the present invention.

DESCRIPTION OF THE PREFERRED EMBODIMENT

1. Detailed Description of the Figures

Figure 1:
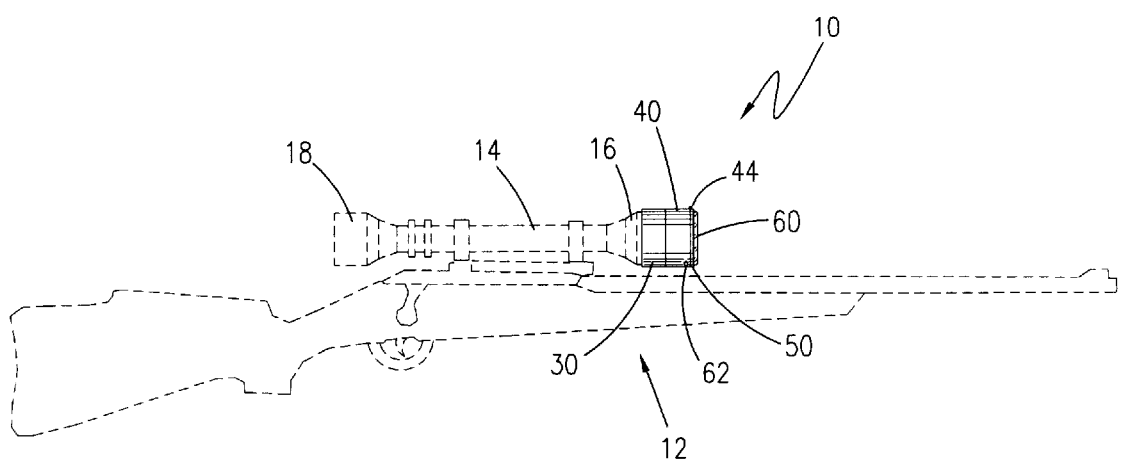
FIG. 1 is a perspective view of a water-resistant scope shade attachment apparatus according to the preferred embodiment of the present invention shown attached to a sighting end of a telescopic sight.
Figure 2:
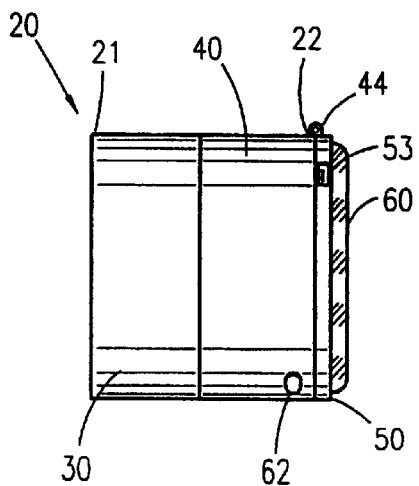
FIG. 2 a side view of the water-resistant scope shade attachment apparatus according to the preferred embodiment of the present invention.
Figure 3:
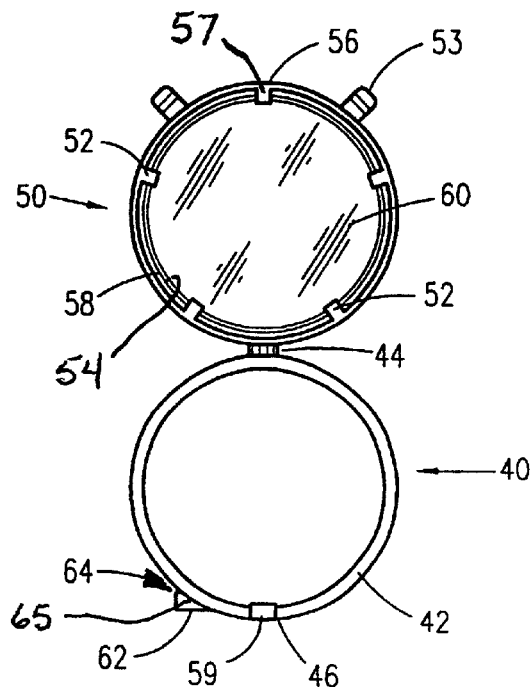
FIG. 3 is a front end elevational view thereof shown with the pivoting hood in an open position.
Figure 4:
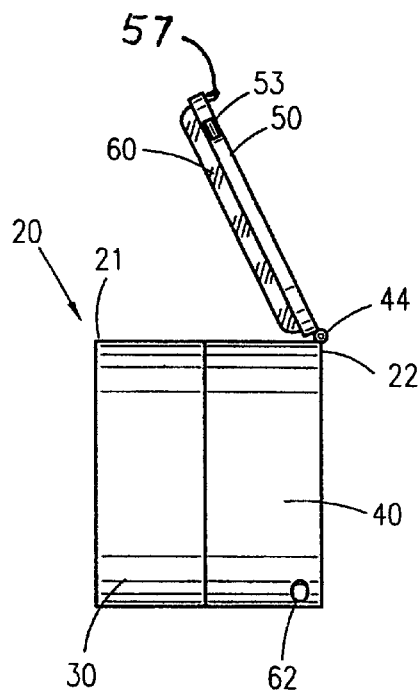
FIG. 4 is a side view thereof shown with the pivoting hood in an open position.
Figure 8:
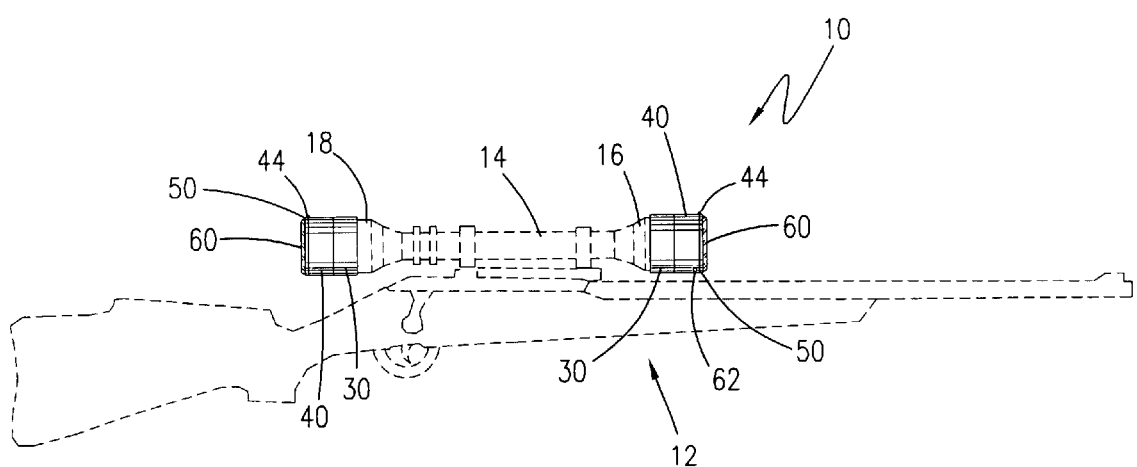
FIG. 8 is a perspective view according to an alternate embodiment of the present invention.

Referring now to FIGS. 1–8, a water-resistant scope shade attachment apparatus 10 is shown, according to the present invention, comprised of an attachable, portable, water-resistant sun shielding barrel 20 which includes a barrel grasping collar 30, a barrel body 40, and a pivotal hood 50 for being removably attached to a sighting end 16 of a telescopic sight 14 of a rifle 12.

The sun shielding barrel 20, (hereinafter referred to as barrel 20), is of a linearly elongated cylindrical, hollow configuration having an anterior end 21 opposite a posterior end 22.

The barrel grasping collar 30 is designed having a diameter slightly larger than the diameter of the sighting end 16 of a telescopic sight 14, thereby allowing for the barrel grasping collar 30 to mate with the sighting end 16, whereby the barrel grasping collar 30 is securely held thereto through frictional impingement. The barrel grasping collar 30 is inserted on the sighting end 16 a longitudinal distance equal to the longitudinal length of the barrel grasping collar 30.

It is envisioned that the barrel grasping collar 30 may be constructed from a wide variety of flexible plastics; however, rubber is the preferred material. As the barrel grasping collar 30 is designed so as to mate with the sighting end 16 of a telescopic sight 14, rubber is more readily adaptable so as to conform to and securely grip the sighting end 16 and further provides a water-tight seal.

Being flexible, the barrel grasping collar 30 not only permits use on scopes of various sizes and shapes, but also facilitates quick attachment and removal. However, it is envisioned that specifically molded designs would be made available to adapt integrally with specific types and models of commercially available scopes.

It is envisioned that various sizes of the water-resistant scope shade attachment apparatus 10 would be required so as to accommodate various sight ends 16 for different models of telescopic sights 14.

An elongated, hollow barrel body 40 formed of flexible plastic is located adjacent to the barrel grasping collar 30 and extends longitudinally therefrom to the posterior end 22 of the barrel 20.

A pivoting hood 50 is attached to the barrel body 40 by a hinge 44 which is mounted to a top external circumferential surface of the barrel body 40 at the posterior end 22 of the barrel 20, whereby the hood 50 may be pivoted at its hinge point to lay flat against a collar 42 of the barrel body 40. The pivoting hood 50 includes a plurality of projections 52 formed at various points along an inner periphery 54 of the pivoting hood 50 for removably securing a lens 60 (as will be described in greater detail below).

The projections 52 are spaced at an equal distance from one another and are formed of plastic material having resilient properties permitting flexing within reasonable limits for permitting a lens 60 to be inserted at the inner periphery 54 of the pivoting hood 50 and returning to its natural configuration after releasing of tension, thereby removably securing a lens 60 to the inner periphery 54.

The pivoting hood 50 further includes a thin, soft rubber membrane 56 circumferentially joined to a collar 58 thereof so as to form a water-impermeable seal upon a user laying the hood 50 flat against the collar 42 of the barrel body 40. A pair of manipulating impingement tabs 53 extend outward beyond the outer circumferential perimeter of the hood 50 to allow for easy manipulation of the hood 50 into an open or closed condition.

The hood 50 and the barrel body 40 can be locked into their closed position via a hood locking assembly 64. The hood locking assembly 64 is designed so as to cooperate with a hole 46 formed in the collar 42 at a bottom of the barrel body 40.

The hood locking assembly 64 includes a flange 57 formed along a top of the collar 58 of the hood 50 for being removably inserted into the hole 46 of the barrel body 40 so as to be securely locked therein. The flange 57 of the hood 50 is securely held in a locked position via a locking means 59. The locking means 59 is designed to securely hold the flange 57 in position through mechanical interference until such mechanical interference is removed by depression of a hood release button 62. The hood release button 62 is located adjacent to the hole 46 of the barrel body 40 wherein the button 62 extends through an aperture 65 formed therein, and is positioned laterally. The hood release button 62 is designed so as to release the flange 57 from the hole 46 of the barrel body 40 upon being depressed by a user, thereby allowing the pivoting hood 50 to be opened and allowing the user to replace the present lens 60 with an alternate lens.

The locking means 59 disclosed wherein mechanical interference is removed via a button 62 is of the type widely known in the art.

It is envisioned that the lens 60 is of a circular configuration being shaped flat or slightly convex, having a diameter so as to be fittingly received on the collar 58 of the pivoting hood 50, and that various degrees of shaded lens having an antifog feature are available to the user. Alternatively, a photogray lens which automatically adjust to outside light may be utilized.

It is further envisioned that an amber shaded lens 60 be used by the user in low light so as to more readily see game in dark areas. The use of an amber shaded lens 60 effectively removes an animal's natural camouflage with its surroundings and further removes long shadows.

It is still further envisioned that the shaded lens not only provide UVA, UVB, and UVC protection, but also be scratch and shatter proof as well.

At this point, a user can remove the inserted lens 60 and replace it with another desired lens 60. Because the present invention utilizes a pivoting hood 50, the lens 60 can be replaced while the present invention remains attached to the telescopic sight 14, thereby allowing the user to quickly change lens 60, which is especially advantageous when game has been spotted by the user.

Once a chosen lens 60 has been securely placed at the inner periphery 54 of the hood 50, the user simply closes the hood 50 so as to actuate the locking means 59 and the hood 50 is securely locked to the barrel body 40, thereby forming a water-impermeable seal which also keeps the sighting end 16 of the telescopic sight 14 dry, clean and protected.

The pivoting hood 50 further allows the user the option of maintaining the hood 50 in an open position while hunting, thereby allowing the user to utilize the telescopic sight 14 in a conventional fashion, and then closing the hood 50 when needed.

The water-resistant scope shade attachment apparatus 10 provides the user with a water-resistant, glare-free rifle telescopic sight 14 attachment which eases eye strain when hunting game in bright sunlight.

An alternate embodiment of the present invention is anticipated for removable attachment to a front sight 18 of a telescopic sight 14 for use in conjunction with the water-resistant scope shade attachment apparatus 10 so as to provide a user with greater visibility for spotting game and reducing sun glare. The alternate embodiment being designed and configured identical to the preferred embodiment with a single exception for attachment being that the alternate embodiment is inserted on a front sight 18 of a telescopic sight 14 a longitudinal distance such that the front sight 18 rests just short the pivoting hood 50.

It is envisioned that the present invention may be utilized with but not limited to cameras, telescopes, and binoculars. Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A water-resistant scope shade attachment apparatus comprising:

a sun shielding barrel which includes an elongated flexible, hollow barrel grasping collar and a barrel body, wherein said sun shielding barrel is removably attached to a sighting end of a telescopic sight of a rifle; and a pivoting hood affixed to said barrel body, said pivoting hood is attached to said barrel body by a hinge which is mounted to a top external circumferential surface of said barrel body at the posterior end of said sun shielding barrel, whereby said pivoting hood is pivoted at its hinge point to lay flat against a collar of said barrel body, and wherein said pivoting hood further includes a thin membrane circumferentially joined to a collar of said pivoting hood so as to form a water-impermeable seal upon a user laying said pivoting hood flat against said collar of said barrel body.

2. The water-resistant scope shade attachment apparatus of claim 1, further comprising a pair of manipulating impingement tabs extending outward beyond an outer circumferential perimeter of said pivoting hood to allow for easy manipulation of said pivoting hood into an open or closed condition.

3. The water-resistant scope shade attachment apparatus of claim 1, wherein said pivoting hood includes lens of a circular configuration to be fittingly received on said collar of said pivoting hood.

4. The water-resistant scope shade attachment apparatus of claim 3, wherein said lens can be removed or inserted.

* * * * *